(12) United States Patent
Parker

(10) Patent No.: US 6,603,755 B1
(45) Date of Patent: Aug. 5, 2003

(54) MOBILE TERMINALS, METHODS, AND COMPUTER PROGRAM PRODUCTS THAT CAN FACILITATE THE SELECTION OF A COMMUNICATION SERVICE PROVIDER IN A MULTIPLE COMMUNICATIONS MODE ENVIRONMENT

(75) Inventor: Allen Parker, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/312,563

(22) Filed: May 14, 1999

(51) Int. Cl.$^7$ ................................................ H04B 7/216
(52) U.S. Cl. ...................................... 370/342; 455/432
(58) Field of Search .............................. 370/335, 337, 370/342, 344, 347, 338, 426; 455/432, 433, 435, 552, 553, 414

(56) References Cited

U.S. PATENT DOCUMENTS

| | | | |
|---|---|---|---|
| 5,301,359 A | * 4/1994 | Van Den Heuvel et al. | 455/56.1 |
| 5,428,666 A | * 6/1995 | Fyfe et al. | 379/58 |
| 5,613,213 A | * 3/1997 | Naddell et al. | 455/54.1 |
| 5,655,003 A | 8/1997 | Erving et al. | 379/418 |
| 5,734,980 A | 3/1998 | Hooper et al. | 455/434 |
| 5,778,316 A | * 7/1998 | Persson et al. | 455/434 |
| 5,839,069 A | * 11/1998 | Keshavachar et al. | 455/437 |
| 5,937,351 A | * 8/1999 | Seekings et al. | 455/434 |
| 5,950,130 A | * 9/1999 | Coursey | 455/432 |
| 5,966,667 A | * 10/1999 | Halloran et al. | 455/552 |
| 6,195,532 B1 | * 2/2001 | Bamburak et al. | 455/31.1 |
| 6,259,917 B1 | * 7/2001 | Elzein | 455/435 |

FOREIGN PATENT DOCUMENTS

| | | |
|---|---|---|
| EP | 0 781 064 A2 | 6/1997 |
| WO | WO 97/30561 | 8/1997 |

OTHER PUBLICATIONS

International Search Report, PCT/US00/12777, Oct. 11, 2000.

* cited by examiner

Primary Examiner—Lester G. Kincaid
Assistant Examiner—Naghmeh Mehrpour
(74) Attorney, Agent, or Firm—Myers Bigel Sibley & Sajovec, P.A.

(57) ABSTRACT

Using service provider selection methodologies and protocols developed for each specific communication mode, a configurable overlay can be created that can maximize the usability or availability of a multi-mode terminal or other communication device. A service provider can be selected for a primary communication mode using mode-specific provider can be selected for a primary communication mode using a mode-specific methodology or protocol to make the selection. The selection service provider is classified in accordance with a service provider selection model that defines a continuum of common service provider preference levels. The common service provider preference levels may includes a first category or reference levels that represent suitable or desirable communication service from which service may be required.

27 Claims, 10 Drawing Sheets

| Rank | Mode |
|------|------|
| 1 | TIA/EIA-136 |
| 2 | GSM |
| ⋮ | ⋮ |
| n | nth mode |

| Service Provider Selection Model | TIA/EIA-136 Classifications | GSM Classifications |
|---|---|---|
| Home | Home | Home |
| Class A | Partner | |
| Class B | | |
| Class C | Enhanced Favored | Preferred |
| Class D | | |
| Class E | Favored | |
| Class F | | |
| Class G | | |
| Unknown | Neutral | Any other |
| Forbidden | Forbidden | Forbidden |

*FIG. 5*

| Service Provider Selection Model | TIA/EIA-136 Classifications | GSM Classifications |
|---|---|---|
| Home | Home | Home |
| Class A | Partner | |
| Class B | | Preferred |
| Class C | | |
| Class D | Enhanced Favored | |
| Class E | | |
| Class F | Favored | |
| Class G | | |
| Unknown | Neutral | Any other |
| Forbidden | Forbidden | Forbidden |

*FIG. 6*

| Service Provider Selection Model | TIA/EIA-136 Classifications | GSM Classifications | ••• | nth Mode Classifications |
|---|---|---|---|---|
| Home | Home | Home | | |
| Class A | Partner | | | |
| Class B | | Preferred | | |
| Class C | | | | |
| Class D | Enhanced Favored | | | |
| Class E | Favored | | | |
| Class F | | | | |
| Class G | Neutral | Any other | | |
| Unknown | Forbidden | | | |
| Forbidden | Forbidden | Forbidden | | |

*FIG. 9*

MOBILE TERMINALS, METHODS, AND COMPUTER PROGRAM PRODUCTS THAT CAN FACILITATE THE SELECTION OF A COMMUNICATION SERVICE PROVIDER IN A MULTIPLE COMMUNICATIONS MODE ENVIRONMENT

FIELD OF THE INVENTION

The present invention relates generally to the field of communication, and, more particularly, to the selection of a communication service provider in a multiple communication mode (hereinafter multi-mode) environment.

BACKGROUND OF THE INVENTION

Traditional mobile terminals used for wireless or cellular communication typically operate using a single communication mode or wireless access technology. That is, a mobile terminal may be designed to communicate using, for example, frequency division multiple access (FDMA) technology (e.g., the advanced mobile phone service (AMPS) standard), time division multiple access (TDMA) technology (e.g., the Telecommunication Industry Association (TIA)/ Electronic Industries Association (EIA) 136 or digital AMPS (DAMPS) standard), global system for mobile communication (GSM) technology, or code division multiple access (CDMA) technology (e.g., TIA interim standard (IS) 95). Wireless or cellular service is typically provided to a consumer through a "home" service provider. The home service provider is generally able to provide full service to the consumer within certain geographic regions in which the home service provider is licensed by the Federal Communications Commission (FCC). Because service providers typically do not provide ubiquitous service, alliances may be formed between service providers to expand their geographic coverage for serving customers.

An example of alliances between service providers is illustrated in FIG. 1. A first service provider can serve its customers in region 22, but it also competes with the second and the third providers within portions of region 22. The second and the third service providers serve their customers in regions 24 and 26 respectively. Because the second and the third service providers do not compete, they may establish a "partner" relationship to allow their customers to obtain service from the other service provider when they are within the other service provider's geographic region. As a result, their customers benefit from an extended geographic coverage region. Similarly, a fourth service provider may serve customers in region 28 and compete with the second service provider in the overlap between regions 24 and 28. The fourth service provider may not, however, compete with the first service provider 22 and, therefore, may establish a "partner" relationship with the first service provider 22 similar to the relationship between the second and the third providers. Several other service provider classifications such as "favored," "enhanced favored," "neutral," or "forbidden" may be defined to represent the nature of a relationship between two service providers, which can be used to allow wireless or cellular customers to obtain service from other service providers when they leave their home service provider's region.

For example, when a customer attempts to establish a wireless or cellular call outside of their home service provider's service area, the mobile terminal may scan or survey the frequency spectrum to detect the available service providers in that area. If a service provider is detected that has established a relationship with that customer's home service provider (e.g., status of partner, favored, neutral, etc.), then the mobile terminal may select that service provider for completion of the call.

Several protocols have been developed for selecting a service provider. Unfortunately, these protocols may be proprietary and/or specific to a particular communication mode or standard (e.g., AMPS, TIA/EIA-136, GSM, etc.). Many current generation mobile terminals, however, include the ability to communicate using more than one communication mode and are therefore termed multi-mode mobile terminals. Thus, traditional service provider selection protocols may not take full advantage of the capabilities of these multi-mode mobile terminals. Moreover, mergers or alliances between wireless or cellular service providers may bring previously incompatible communication modes or access technologies together under the same corporate umbrella. The continued growth of wireless or cellular services into international markets may also result in new service profiles and/or competitive scenarios in which multi-mode service selection may be advantageous.

Consequently, a need continues to exist for improved service provider selection strategies.

SUMMARY OF THE INVENTION

It is therefore an object of the present invention to provide improved mobile terminals, methods, and computer program products that can be used in a multi-mode environment.

It is another object of the present invention to provide improved mobile terminals, methods, and computer program products that can improve the selection of a communication service provider in a multi-mode environment.

It is still another object of the present invention to provide an improved service provider classification model that can be used with mobile terminals, methods, and computer program products to select a communication service provider.

These and other objects, advantages, and features of the present invention can be provided by mobile terminals, methods, and computer program products that allow multiple communication modes to be surveyed to locate a suitable or desirable communication service provider. The threshold for what is acceptable and what is not can be based on service provider preference rather than technology-specific protocols. Moreover, by using service provider selection methodologies and protocols developed for each specific communication mode, the present invention creates a configurable overlay that can maximize the usability or availability of a multi-mode mobile terminal or other communication device.

In accordance with an illustrative embodiment of the present invention, a service provider can be selected for a primary communication mode using a mode-specific methodology or protocol to make the selection. The selected service provider is classified in accordance with a service provider selection model that defines a continuum of common service provider preference levels. Because different communication modes may use different classification labels for service providers, the service provider selection model of the present invention can be used to integrate these potentially disparate classification schemes into a common framework. The common service provider preference levels may include a first category of preference levels that represent suitable or desirable communication service providers from which service may be acquired. In addition, the common service provider preference levels may also include a second category of preference levels that represent unsuitable service providers from which service should not or cannot be acquired. If a service provider selected for a particular communication mode maps into a service provider preference level classification that falls into the unsuitable category, then a service provider is selected for an alternative communication mode using a selection methodology or protocol specific to that communication mode.

In accordance with an aspect of the invention, an adjustable threshold can be used with the service provider selection model to divide a third category of preference levels into the first and second categories representing suitable and unsuitable service providers. The adjustable threshold provides flexibility in the service provider selection model to either narrow or broaden the range of service providers that would be suitable candidates from which service may be acquired.

In accordance with another aspect of the invention, communication modes may be ranked to define an order in which they will be used to find a suitable service provider.

In accordance with still another aspect of the invention, multiple communication modes can be surveyed in parallel to select a service provider for each mode using mode-specific selection methodologies or protocols. The highest classified service provider from among those service providers that fall in the suitable category is selected for establishing service therefrom.

The present invention, therefore, can provide a predictable, reliable, and consistent mechanism for determining which communication mode to use and which provider to select when establishing service. Such stability in multi-mode service selection can assure service provider revenue in cross-technology business agreements and can provide a foundation for multi-mode partnerships and business planning.

BRIEF DESCRIPTION OF THE DRAWINGS

Other features of the present invention will be more readily understood from the following detailed description of specific embodiments thereof when read in conjunction with the accompanying drawings, in which:

FIG. 5 illustrates a first mapping of service provider classifications into a service provider selection model of FIG. 4 for two exemplary communication mode types;

FIG. 6 illustrates a second mapping of service provider classifications into a service provider selection model of FIG. 4 for two exemplary communication mode types;

FIG. 9 illustrates an exemplary mapping of service provider classifications into a service provider selection model of FIG. 4 for multiple communication mode types.

DETAILED DESCRIPTION OF PREFERRED EMBODIMENTS

Figures 1, 8:
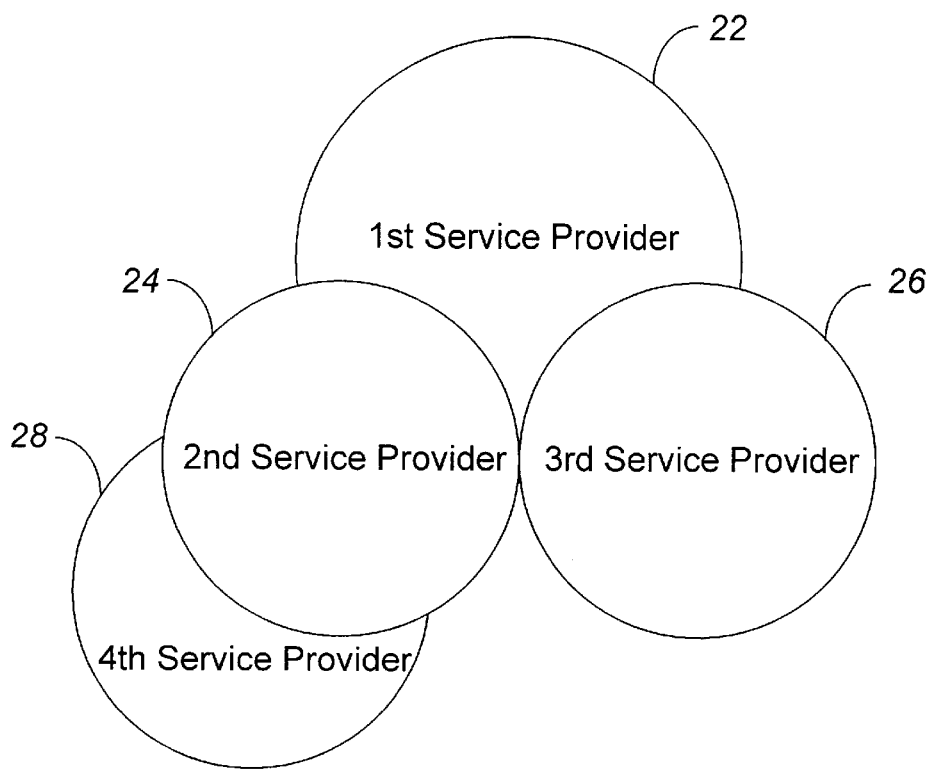
FIG. 1 illustrates a conventional service arrangement for a plurality of communication service providers in a geographic area.
FIG. 8 illustrates a communication mode ranking table in accordance with the present invention that can be used with the mobile terminals, methods, and computer program products of FIG. 3.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention can be embodied as a mobile terminal, method, or computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 2:
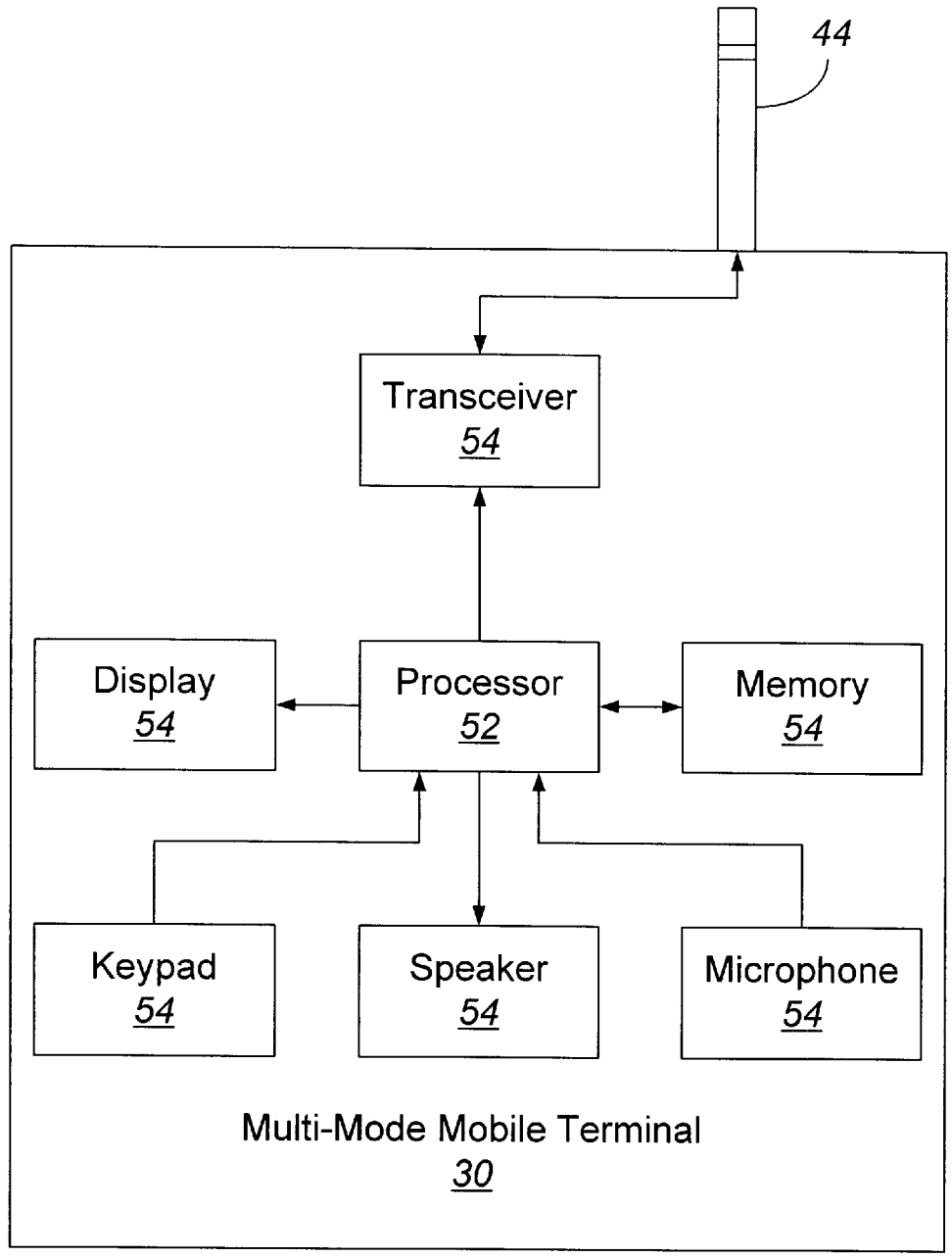
FIG. 2 is a mobile terminal that illustrates multi-mode mobile terminals in accordance with the present invention.

Referring now to FIG. 2, a multi-mode mobile terminal 30 in accordance with the present invention typically includes a keypad 32, a display 34, a speaker 36, a microphone 38, a transceiver 42, and a memory 54 that communicate with a processor 52. The transceiver 42 receives incoming signals from and transmits outgoing signals to an antenna 44. These components are included in many conventional mobile terminals and their functionality is generally known to those skilled in the art.

Figure 3:
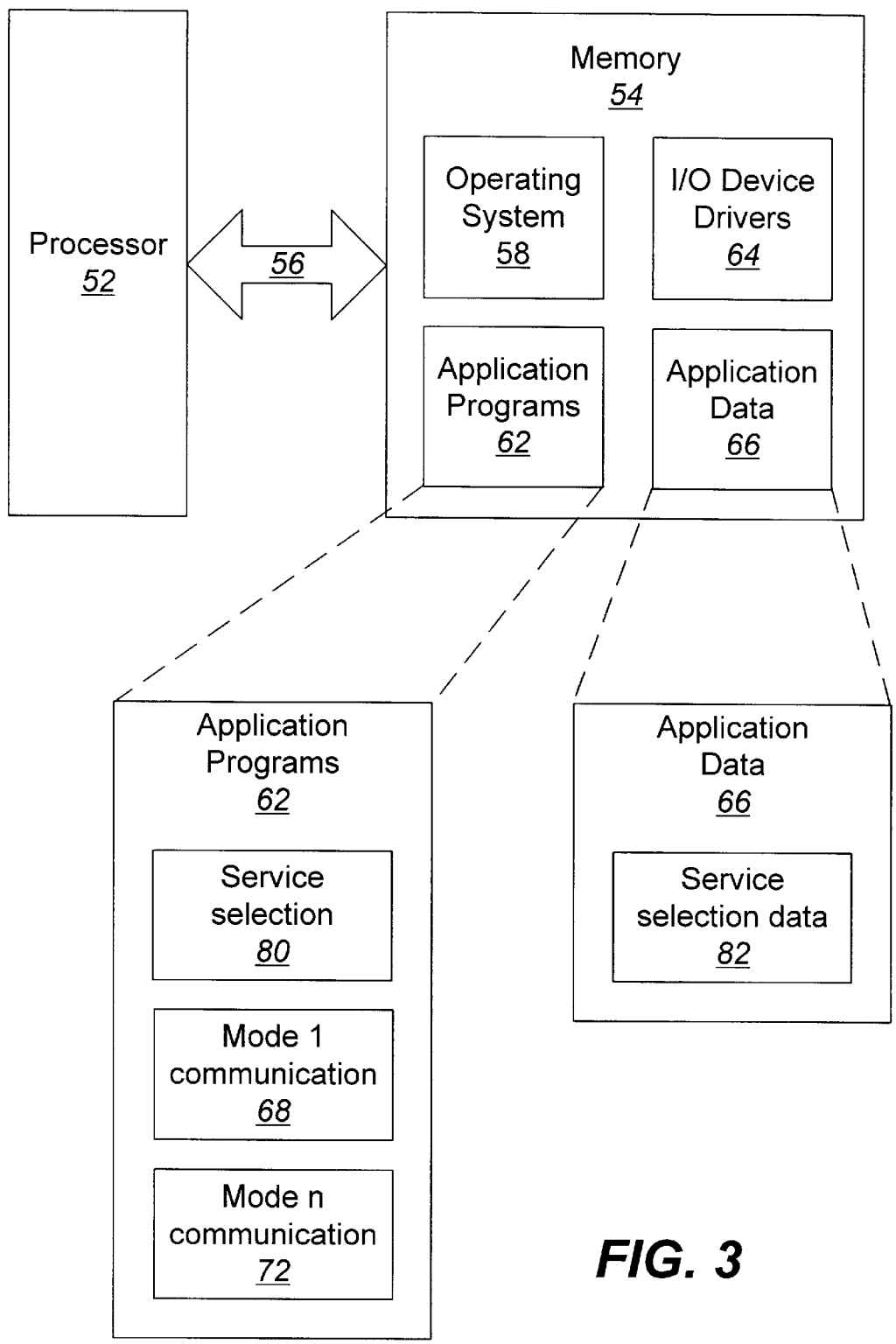
FIG. 3 is a high-level block diagram of a mobile terminal of FIG. 2 that illustrates mobile terminals, methods, and computer program products in accordance with the present invention.

FIG. 3 illustrates the processor 52 and memory 54 in more detail. The processor 52 communicates with the memory 54 via an address/data bus 56. The processor 52 can be any commercially available or custom microprocessor suitable for an embedded application. The memory 54 is representative of the overall hierarchy of memory devices containing the software and data used to implement the functionality of the multi-mode mobile terminal 30. The memory 54 can include, but is not limited to, the following types of devices: cache, ROM, PROM, EPROM, EEPROM, flash, SRAM, and DRAM.

As shown in FIG. 3, the memory 54 may hold four major categories of software and data used in the multi-mode mobile terminal 30: the operating system 58; the application programs 62; the input/output (I/O) device drivers 64; and the application program data 66. The operating system 58 should be designed for real time embedded applications and, preferably, is relatively compact to make the most efficient use of the memory 64. The I/O device drivers 64 typically include software routines accessed through the operating system 58 by the application programs 62 to communicate with devices such as the keypad 32, display 34, speaker 36, microphone 38, and certain memory components. Finally, the application programs 62 comprise the control programs that implement the various features of the multi-mode mobile terminal 30.

The application programs 62 may include several modules corresponding to various features of the multi-mode mobile terminal 30, as shown in FIG. 3. In particular, the application programs 62 may comprise multiple communication protocol programs corresponding to the communication modes with which the multi-mode mobile terminal 30 is compatible. These communication protocol programs are represented as mode one communication program 68 and mode n communication program 72. In addition, the application programs 62 include a service selection program 80 in accordance with the present invention that can be used to survey multiple communication modes to locate a suitable service provider for establishing a communication session (e.g., a voice call, an Internet connection, a facsimile transfer, etc.). The application data 66 includes service selection data 82 that represents the static and dynamic data used by the service selection program 80.

Figure 4:
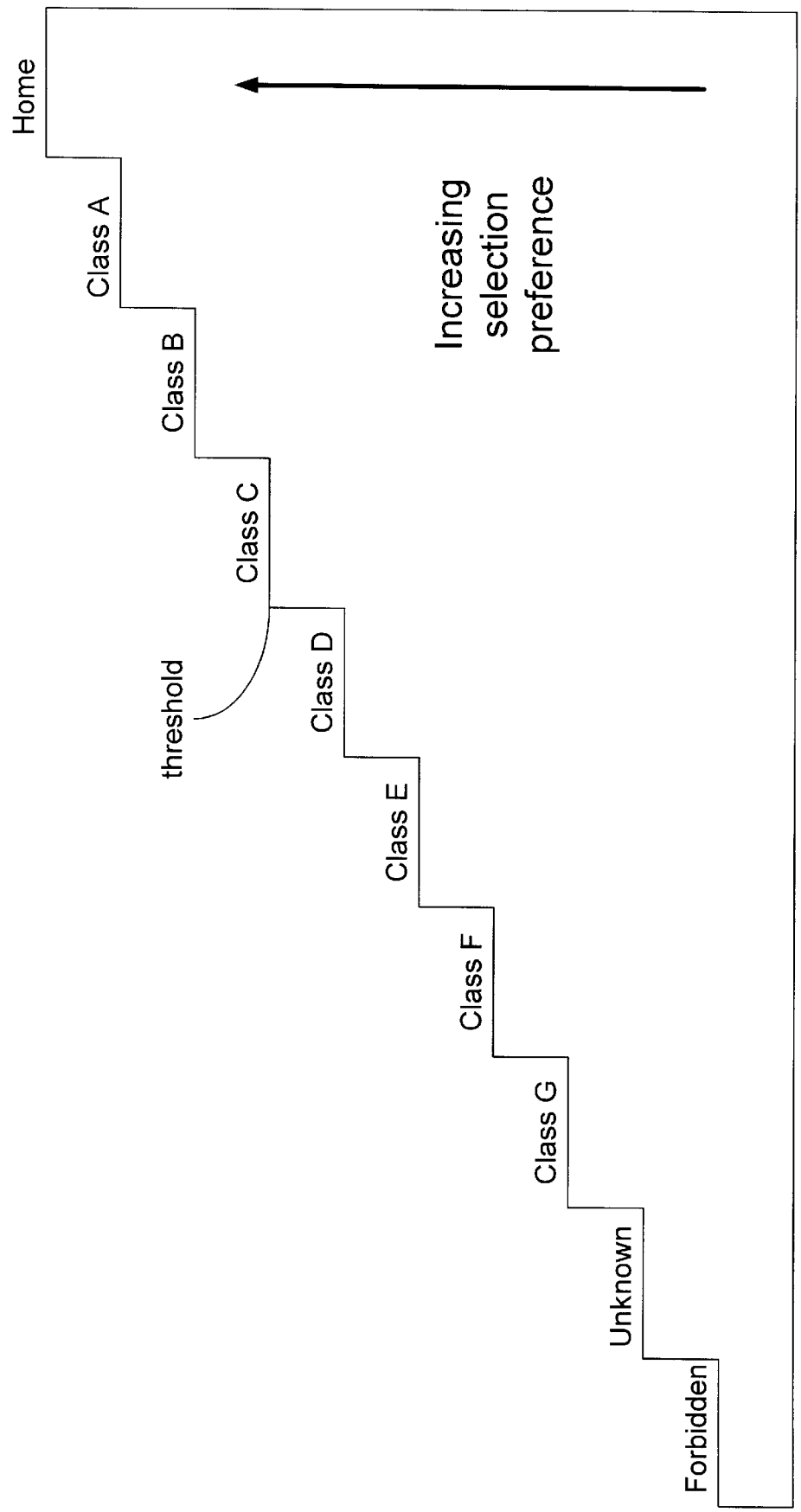
FIG. 4 illustrates a service provider selection model in accordance with the present invention that can be used with the mobile terminals, methods, and computer program products of FIG. 3.

The service selection program 80, in a preferred embodiment thereof, uses a service provider selection model for classifying service providers along a continuum of common service provider preference levels. This continuum is illustrated in FIG. 4 where ten preference levels are defined ranging from "forbidden," which is least preferred, to "home," which is most preferred. The service provider selection model may also include an adjustable threshold that can be used to divide the preference levels between those levels that represent suitable or desirable service providers from which service may be acquired and those levels that represent unsuitable or undesirable service providers from which service may not or cannot be acquired. While ten preference levels are used in a preferred embodiment of the present invention, alternative numbers can be used to provide an appropriate measure of distinction between service providers.

As discussed hereinbefore, several communication mode specific protocols have been developed for selecting a service provider. The service provider selection model of the present invention can be used to integrate the potentially disparate classification schemes used in the communication protocols for the different communication modes into a common framework. For example, FIG. 5 depicts a possible mapping of both the TIA/EIA-136 and GSM classification schemes into the service provider selection model of FIG. 4.

Note that the ten-preference level service provider selection model provides room for additional distinctions between service providers for these two communication modes. The mappings of communication mode specific classification labels into the service provider selection model can be dynamically and/or statically stored as part of the service selection data 82 (see FIG. 3).

By properly mapping the classification labels for the communication mode protocols into the service provider selection model and setting the adjustable threshold, the service provider selection model can be biased in favor of one communication mode over another. This is illustrated by comparing the classification mapping of FIG. 6 with the mapping of FIG. 5. In the FIG. 5 mapping, the TIA/EIA-136 classification of "Enhanced Favored" and the GSM classification of "Preferred" are both mapped to the Class C preference level. In the FIG. 6 mapping, however, the TIA/EIA-136 classification of "Enhanced Favored" is mapped to the Class D preference level while the GSM classification of "Preferred" is mapped to the Class B level. Thus, with the adjustable threshold set between the Class C and the Class D preference levels, the mapping of FIG. 6 tends to favor the GSM communication mode over the TIA/EIA-136 communication mode. That is, the service selection program 80 (see FIG. 3) seeks a service provider having a classification of Class C or higher (i.e., more preferred as defined by the service provider selection model of FIG. 4). In the FIG. 5 mapping, TIA/EIA-136 service providers having a classification label of "Enhanced Favored" meet this criterion. In the FIG. 6 mapping, however, TIA/EIA-136 service providers having a classification label of "Enhanced Favored" fall below the threshold and thus would not be considered a desirable or suitable carrier for use. On the other hand, GSM service providers having a classification label of "Preferred" still remain above the threshold and are even classified with a more preferred Class B preference level.

The present invention is described hereinafter with reference to flowchart illustrations of mobile terminals, methods, and computer program products according to an embodiment of the invention. It will be understood that each block of the flowchart illustrations, and combinations of blocks in the flowchart illustrations, can be implemented by computer program instructions. These computer program instructions can be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Figure 7:
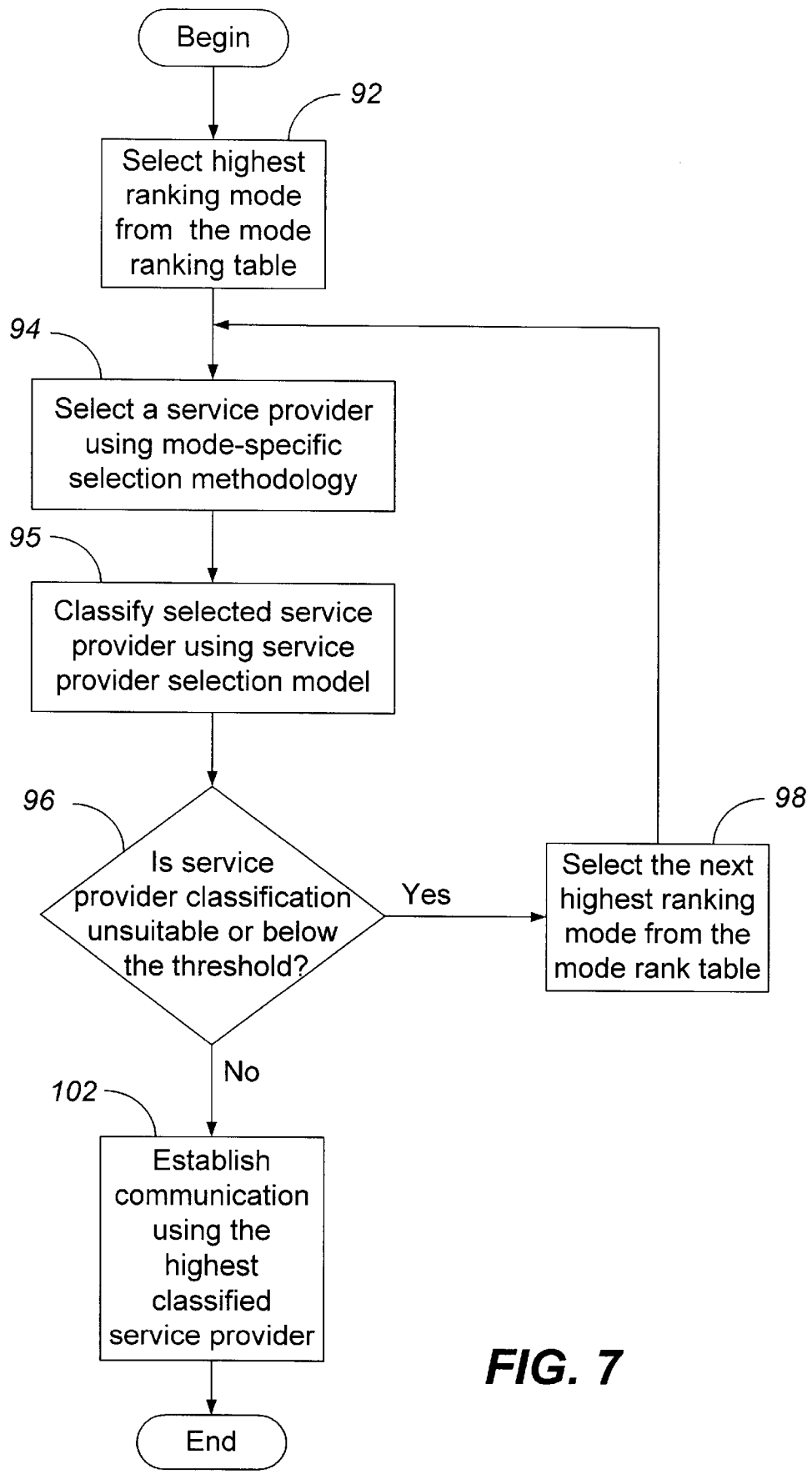
FIG. 7 is a flow chart that illustrates operations of the mobile terminals, methods, and computer program products of FIG. 3.

With reference now to FIG. 7, the communication service provider selection process begins at block 92 where the service selection program 80 selects a primary communication mode to use for establishing service. In particular, the service selection program 80 preferably uses a table in which communication modes are assigned a rank from one to n as shown in FIG. 8. This communication mode ranking table defines the order in which a multi-mode mobile terminal 30 will cycle through communication modes in attempting to find a suitable service provider. In a preferred embodiment, the communication mode ranking table of FIG. 8 is stored as dynamic data in the memory 54 as part of the service selection data 82. This allows the multi-mode mobile terminal 30 to update the communication mode rankings to adapt to changing conditions. For example, the multi-mode mobile terminal 30 may assign the number one ranking to the communication mode by which service was last acquired or to the communication mode by which service was last acquired at or above a certain preference level (e.g., Class A or Home).

Communication modes may be identified in a variety of ways in the communication mode ranking table of FIG. 8. For example, a communication mode may be identified as an access technology such as FDMA, TDMA, CDMA, or GSM. Alternatively, a communication mode may be identified as a particular standard within an access technology, such as TIA/EIA-136, GSM 1800, or IS-95.

The communication mode ranking table of FIG. 8 may comprise one list of rankings for the various communication modes, or, alternatively, may comprise multiple lists of communication mode rankings corresponding to different services or applications. For example, separate communication mode ranking lists may be maintained for voice service and data service. In fact, a particular communication mode, such as GSM, may be assigned one ranking in a voice service list and a different ranking in a data service list.

After a primary communication mode has been selected, the service selection program 80 scans the frequency spectrum for service providers at block 94 to select a service provider using a selection methodology or protocol associated with the selected communication mode. To identify service providers, the service selection program 80 may use a unique identifier, e.g., the TIA/EIA-136 System Operator Code (SOC), which is typically transmitted over a digital control channel (DCC) or broadcast control channel (BCC). When a service provider is identified, the service selection program 80 determines what classification label has been assigned to that service provider for the present communication mode. This mapping is typically defined by the customer's home service provider based on business relationships established with other service providers and is stored in the memory 54 as part of the service selection data 82. The initial assignment of mode-specific classification labels to the service providers is typically programmed at the manufacturing site. Because the mode-specific classification labels may change as new business relationships are formed, however, these labels are preferably programmable from, for example, the home service provider through radio signals or through a wired connection, such as a network, or directly through a computer port.

At block 95, the service selection program 80 classifies the service provider selected at block 94 according to the service provider selection model of FIG. 4 to identify a highest classified service provider for the present communication mode. Recall from the foregoing discussion of FIGS. 5 and 6 that the service provider selection model of FIG. 4 is populated by mapping the classification labels for the communication mode protocols into specific preference levels and setting the adjustable threshold to a desired position. FIG. 9 illustrates a service provider selection model of FIG. 4 that includes an exemplary mapping of service provider classification labels for both the TIA/EIA-136 communication mode and the GSM communication mode, and which can further be extended to include mappings for up to n communication modes.

Thus, in summary, the service selection program 80 can obtain a classification label for a service provider selected for the current communication mode and, based on the mapping of this classification label into the service provider selection model (see, e.g., FIG. 9), determine a preference level (e.g., Home, Class A, etc.) for the service provider.

At block 96 the service selection program 80 determines whether the classification (i.e., preference level) of the highest classified service provider for the currently selected communication mode is suitable to allow service to be acquired from this service provider. This can be done by comparing the preference level with the adjustable threshold to determine whether the preference level is above or below the threshold. For example, the adjustable threshold is set between the Class C and Class D preference levels in FIG. 9. Therefore, for the TIA/EIA-136 communication mode, only those service providers having an TIA/EIA-136 classification label of Home or Partner, which map into preference levels Home and Class A respectively, would be suitable service providers from which service may be obtained.

Alternatively, certain preference levels may be deemed automatically suitable or unsuitable irrespective of the adjustable threshold. For example, Home and Class A preference levels may be considered automatically suitable and service will be immediately established using service providers with these classifications whenever they are detected. Conversely, Unknown and Forbidden preference levels may be considered automatically unsuitable thereby ensuring that service is never obtained from service providers with these classifications. The remaining preference levels of Class B through Class G comprise a third category that includes both suitable and unsuitable preference levels. The adjustable threshold can be used to separate the suitable preference levels from the unsuitable preference levels in this third category.

If the classification (i.e., preference level) of the highest classified service provider for the currently selected communication mode is below the adjustable threshold or is automatically unsuitable to allow service to be acquired from this service provider, then the service selection program 80 selects the next highest ranking communication mode as an alternative communication mode from the communication mode ranking table (see FIG. 8) at block 98. The process then repeats at block 94 for the alternative communication mode. For example, based on the entries shown in the communication mode ranking table of FIG. 8 and the service provider selection model of FIG. 9, if the service selection program 80 is unable to detect a service provider having a classification of Class C or above for the TIA/EIA-136 communication mode, then a switch to the GSM communication mode will be triggered at blocks 96 and 98 to find a suitable service provider.

If, however, the classification (i.e., preference level) of the highest classified service provider for the currently selected communication mode is above the adjustable threshold or is automatically suitable, then the service selection program 80 invokes the communication protocol program 68, 72 corresponding to the presently selected communication mode to establish a communication session at block 102.

Mobile terminals, methods, and computer program products have been described in the foregoing in connection with the selection of a communication service provider by sequentially scanning a plurality of communication modes. The principles and concepts of the present invention, however, can also be applied to multi-mode mobile terminals 30 that have advanced receiver architectures enabling them to scan for communication service providers using multiple communication modes simultaneously. These multi-mode mobile terminals 30 typically include multiple demodulators that can allow them to independently decode signals from multiple transmitters in parallel.

Figure 10A:
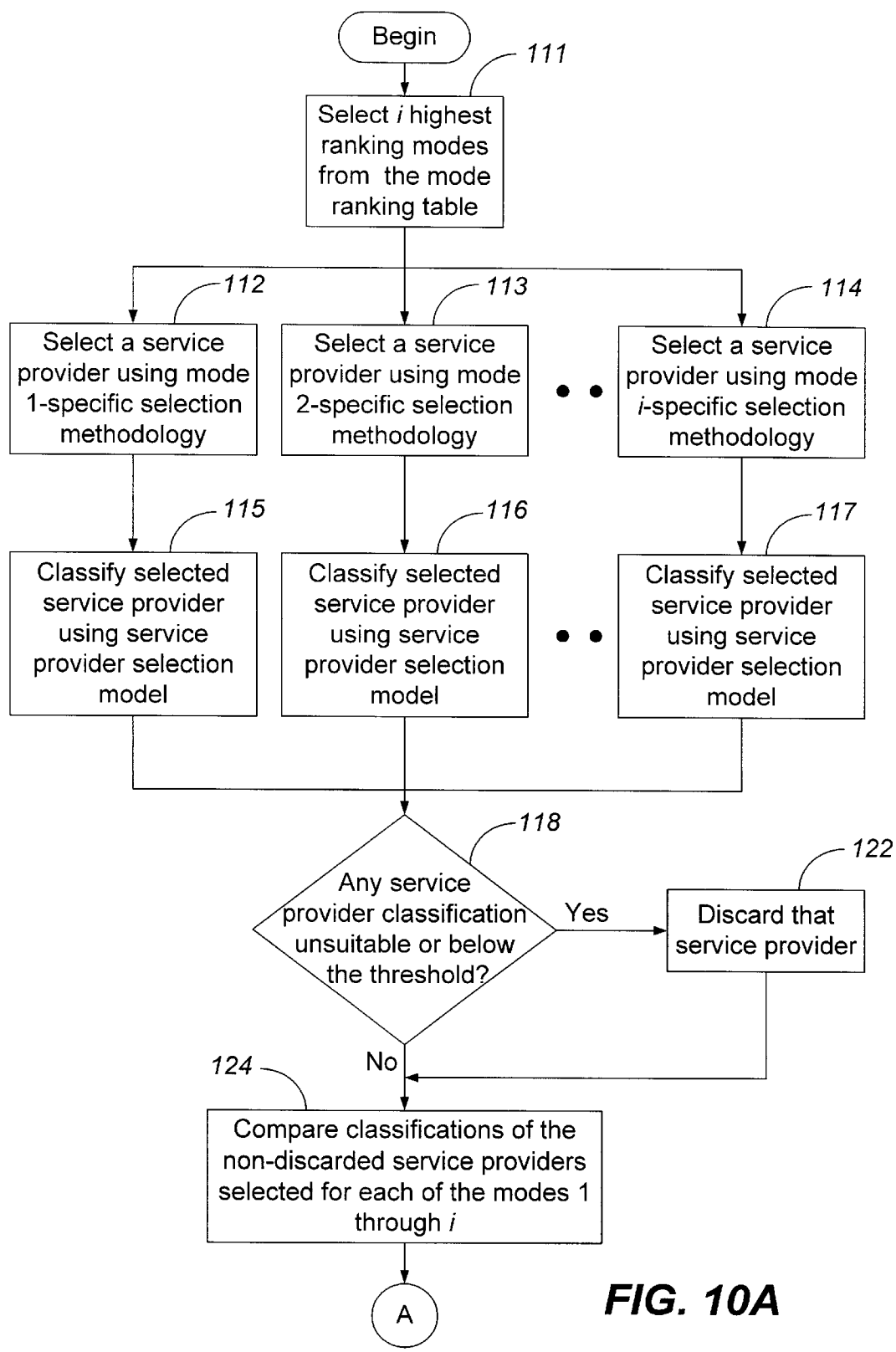
FIGS. 10A–10B are a flow chart that illustrates operations of the mobile terminals, methods, and computer program products of FIG. 3.
Figure 10B:
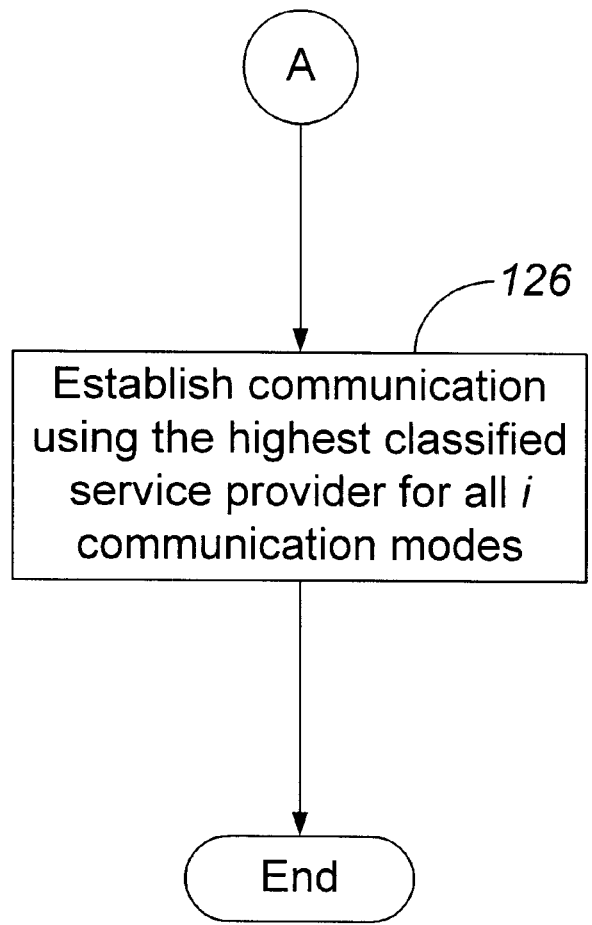

With reference now to FIGS. 10A–10B, the communication service provider selection process for mobile terminals 30 capable of scanning for service providers using multiple communication modes simultaneously begins at block 111. The service selection program 80 selects the i highest ranked communication modes from the communication mode ranking table of FIG. 8 at block 111 and then scans the frequency spectrum at blocks 112, 113, and 114 to select a service provider for each communication mode using communication mode specific selection methodologies or protocols. The number i represents the number of parallel scans-which typically corresponds to the number of demodulators in the mobile terminal 30-that a mobile terminal 30 is capable of performing. The service selection program 80 classifies the service providers according to the service provider selection model of FIG. 4 to identify the highest classified service provider for each communication mode at blocks 115, 116, and 117.

At block 118 the service selection program 80 determines whether the classifications (i.e., preference levels) of the highest classified service providers for the currently selected communication modes are suitable to allow service to be acquired from these service providers. This can be done by comparing the preference levels with the adjustable threshold to determine whether the preference level is above or below the threshold. Alternatively, certain preference levels may be deemed automatically suitable or unsuitable irrespective of the adjustable threshold as discussed hereinbefore. These highest classified service providers for the selected communication modes comprise a group of potential candidates from which service may be acquired.

If the classification (i.e., preference level) of any one of the highest classified service providers for the currently selected communication modes is below the adjustable threshold or is automatically unsuitable to allow service to be acquired from that service provider, then that service provider is discarded from the group of potential candidates from which service may be acquired at block 122.

At block 124, the service selection program 80 compares the classifications (i.e., preference levels) of the non-discarded, highest classified service providers for the various communication modes to select a preferred service provider with the highest classification. If multiple service providers have the same classification, then that service provider corresponding to the highest ranked communication mode is selected. Following connector A to FIG. 10B, the service selection program 80 invokes the communication protocol program 68, 72 corresponding to the presently selected communication mode at block 126 to establish a communication session using the preferred service provider selected at block 124.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

I claim:

1. A method of selecting a communication service provider in a multi-mode environment, comprising the steps of:
   selecting a first service provider for a primary communication mode using a selection methodology that is associated with the primary communication mode;
   classifying the first service provider along a continuum of common service provider preference levels that includes a first category of common service provider preference levels and a second category of common service provider preference levels;
   selecting a second service provider for an alternative communication mode using a selection methodology that is associated with the alternative communication mode if the classification of the first service provider is in the first category;
   ranking communication modes in the multi-mode environment; and
   assigning a highest ranking to a communication mode by which communication service was last established.

2. A method as recited in claim 1, further comprising the step of comparing the classification for the first service provider with an adjustable threshold that divides the common service provider preference levels into the first and the second categories.

3. A method as recited in claim 1, wherein the primary communication mode is a highest ranked communication mode and the alternative communication mode is a highest ranked communication mode for which a service provider has not been selected.

4. A method as recited in claim 1, wherein the ranking step further comprises the step of ranking voice communication modes separately from data communication modes.

5. A method as recited in claim 1, further comprising the step of mapping a mode-specific set of service provider preference levels into the continuum of common service provider preference levels for each communication mode in the multi-mode environment.

6. A method as recited in claim 1, wherein the primary communication mode and the alternative communication mode comprise wireless access technologies selected from the group consisting of FDMA, TDMA, CDMA, and GSM.

7. A method of selecting a communication service provider in a multi-mode environment, comprising the steps of:
   selecting a plurality of service providers corresponding to a plurality of communication modes that each have a selection methodology associated therewith;
   classifying the plurality of selected service providers along a continuum of common service provider preference levels;
   selecting a preferred service provider from among the plurality of selected service providers that has a highest service provider preference level among the plurality of selected service providers;
   establishing an adjustable threshold that divides the common service provider preference levels into a first category and a second category; and
   discarding those service providers from the plurality of selected service providers that have a classification in the first category prior to performing the selecting a preferred service provider from among the plurality of selected service providers step.

8. A method as recited in claim 7, further comprising the step of mapping a mode-specific set of service provider preference levels into the continuum of common service provider preference levels for each of the plurality of communication modes.

9. A method as recited in claim 7, wherein the plurality of communication modes comprise wireless access technologies selected from the group consisting of FDMA, TDMA, CDMA, and GSM.

10. A multi-mode mobile terminal, comprising:
first means for selecting a first service provider for a primary communication mode;
means for classifying the first service provider along a continuum of common service provider preference levels that includes a first category of common service provider preference level and a second category of common service provider preference levels;
second means, responsive to the means for classifying, for selecting a second service provider for an alternative communication mode;
first means for ranking a communication modes that are compatible with the multi-mode mobile terminal; and
means, responsive to the means for classifying, for assigning a highest ranking to a communication mode by which communication service was last established.

11. A multi-mode mobile terminal as recited in claim 10, further comprising means for comparing the classification for the first service provider with an adjustable threshold that divides the common service provider preference levels into the first and the second categories.

12. A multi-mode terminal as recited in claim 10, wherein the primary communication mode is a highest ranked communication mode and the alternative communication mode is a highest ranked communication mode for which a service provider has not been selected.

13. A multi-mode mobile terminal as recited in claim 10, wherein the first means for ranking further comprises:
second means for ranking voice communication modes; and
third means for ranking data communication modes.

14. A multi-mode mobile terminal as recited in claim 10, further comprising means for mapping a mode-specific set of service provider preference levels into the continuum of common service provider preference levels for each of a plurality of communication modes that are compatible with the multi-mode terminal.

15. A multi-mode mobile terminal as recited in claim 10, wherein the primary communication mode and the alternative communication mode comprise wireless access technologies selected from the group consisting of FDMA, TDMA, CDMA, and GSM.

16. A multi-mode mobile terminal, comprising:
first means for selecting a plurality of service providers corresponding to a plurality of communication modes;
means for classifying the plurality of selected service providers along a continuum of common service provider preference levels;
second means for selecting a preferred service provider from among the plurality of selected service providers that has a highest service provider preference level among the plurality of selected service providers;
means for establishing an adjustable threshold that divides the common service provider preference levels into a first category and a second category; and
means for discarding those service providers from the plurality of selected service providers that have a classification in the first category, the second means for selecting being responsive to the means for discarding.

17. A multi-mode mobile terminal as recited in claim 16, further comprising means for mapping a mode-specific set of service provider preference levels into the continuum of common service provider preference levels for each of the plurality of communication modes.

18. A multi-mode mobile terminal as recited in claim 16, wherein the plurality of communication modes comprise wireless access technologies selected from the group consisting of FDMA, TDMA, CDMA, and GSM.

19. A computer program product for selecting a communication service provider in a multi-mode environment, comprising:
a computer readable storage medium having computer readable program code means embodied therein, the computer readable program code means comprising:
first computer readable program code means for selecting a first service provider for a primary communication mode;
computer readable program code means for classifying the first service provider along a continuum of common service provider preference levels that includes a first category of common service provider preference levels and a second category of common service provider preference levels;
second computer readable program code means, responsive to the means for classifying, for selecting a second service provider for an alternative communication mode;
first computer readable program code means for ranking communication modes in the multi-mode environment; and
computer readable program code means, responsive to the computer readable program code means for classifying, for assigning a highest ranking to a communication mode by which communication service was last established.

20. A computer program product as recited in claim 19, further comprising:
computer readable program code means for comparing the classification for the first service provider with an adjustable threshold that divides the common service provider preference levels into the first and the second categories.

21. A computer program product as recited in claim 19, wherein the primary communication mode is a highest ranked communication mode and the alternative communication mode is a highest ranked communication mode for which a service provider has not been selected.

22. A computer program product as recited in claim 19, wherein the first computer readable program code means for ranking further comprises:
second computer readable program code means for ranking voice communication modes; and
third computer readable program code means for ranking data communication modes.

23. A computer program product as recited in claim 19, further comprising computer readable program code means for mapping a mode-specific set of service provider preference levels into the continuum of common service provider preference levels for each communication mode in the multi-mode environment.

24. A computer program product as recited in claim 19, wherein the primary communication mode and the alternative communication mode comprise wireless access technologies selected from the group consisting of FDMA, TDMA, CDMA, and GSM.

25. A computer program product for selecting a communication service provider in a multi-mode environment, comprising:
   a computer readable storage medium having computer readable program code means embodied therein, the computer readable program code means comprising:
      first computer readable program code means for selecting a plurality of service providers corresponding to a plurality of communication modes;
      computer readable program code means for classifying the plurality of selected service providers along a continuum of common service provider preference levels;
      second computer readable program code means for selecting a service provider from among the plurality of selected service providers that has a highest service provider preference level among the plurality of selected service providers;
      computer readable program code means for establishing an adjustable threshold that divides the common service provider preference levels into a first category and a second category; and
      computer readable program code means for discarding those service providers from the plurality of selected service providers that have a classification in the first category, the second computer readable program code means for selecting being responsive to the computer readable code means for discarding.

26. A computer program product as recited in claim 25, further comprising computer readable program code means for mapping a mode-specific set of service provider preference levels into the continuum of common service provider preference levels for each of the plurality of communication modes.

27. A computer program product as recited in claim 25, wherein the plurality of communication modes comprise wireless access technologies selected from the group consisting of FDMA, TDMA, CDMA, and GSM.

* * * * *

UNITED STATES PATENT AND TRADEMARK OFFICE
CERTIFICATE OF CORRECTION

PATENT NO. : 6,603,755 B1
DATED : August 5, 2003
INVENTOR(S) : Parker

It is certified that error appears in the above-identified patent and that said Letters Patent is hereby corrected as shown below:

<u>Column 11,</u>
Line 16, should read -- provider preference levels and a second category of --

Signed and Sealed this

Thirteenth Day of April, 2004

JON W. DUDAS
*Acting Director of the United States Patent and Trademark Office*